US012536583B2

(12) United States Patent
Kramer et al.

(10) Patent No.: US 12,536,583 B2
(45) Date of Patent: Jan. 27, 2026

(54) EFFICIENT PROCESSING OF EXTREME INPUTS FOR REAL-TIME PREDICTION OF FUTURE EVENTS

(71) Applicant: Truist Bank, Charlotte, NC (US)

(72) Inventors: Brian Franklin Kramer, Richmond, VA (US); Adam Thomas Lewis, Mechanicsville, VA (US); Maanasa Nagaraja, Laurel, MD (US)

(73) Assignee: TRUIST BANK, Charlotte, NC (US)

( * ) Notice: Subject to any disclaimer, the term of this patent is extended or adjusted under 35 U.S.C. 154(b) by 704 days.

(21) Appl. No.: 17/661,567

(22) Filed: May 2, 2022

(65) Prior Publication Data
US 2023/0351493 A1 Nov. 2, 2023

(51) Int. Cl.
*G06Q 40/03* (2023.01)
*G06N 3/08* (2023.01)
(52) U.S. Cl.
CPC .............. *G06Q 40/03* (2023.01); *G06N 3/08* (2013.01)
(58) Field of Classification Search
CPC ...... G06Q 40/03; G06Q 30/0631; G06N 3/08; G06N 3/044; G06N 3/045; G06N 3/0464; G06N 3/088; G06N 3/0895; G06N 3/09
See application file for complete search history.

(56) References Cited

U.S. PATENT DOCUMENTS 10,628,882 B1\* 4/2020 Casey ....................... G06N 5/04
2018/0349790 A1\* 12/2018 Cai ........................ G06N 20/00
2019/0392252 A1 12/2019 Fighel
2020/0193331 A1 6/2020 Larson
2020/0272855 A1 8/2020 Kang
2020/0302337 A1 9/2020 Jeffery
2020/0311557 A1 10/2020 Jin
2020/0327604 A1\* 10/2020 Morin ................ G06Q 30/0631
(Continued)

OTHER PUBLICATIONS

Jia, W., Sun, M., Lian, J., & Hou, S. (Jan. 2022). Feature dimensionality reduction: a review. Complex & Intelligent Systems, 8(3), 2663-2693. (Year: 2022).\*

(Continued)

*Primary Examiner* — Vincent Gonzales
(74) *Attorney, Agent, or Firm* — Michael A. Springs, Esq.; Shumaker, Loop & Kendrick, LLP; Patrick B. Horne

(57) ABSTRACT

A system for reducing input data size for use in an artificial intelligence (AI) engine for predicting a subsequent event. The system includes a computer configured to implement instructions to receive input data and time data indicative of previous events associated with users. The instructions configure the system to determine interface channels associated with modes of interface with the users, previous event characteristics, or both. The system implements instructions associating previous event data with time windows. The instructions configure the system to generate user window values for the combinations of users and time windows. The user window values indicate the interface channels and previous event characteristics of data within the respective time windows. Implementing the instructions configures the system to form a first portion of the raw input data having an association value below a threshold with respect to preceding the subsequent event and generate condensed input data.

16 Claims, 8 Drawing Sheets

(56) References Cited

U.S. PATENT DOCUMENTS

2021/0117851 A1* 4/2021 Jumper .................. G06Q 40/12
2021/0342635 A1 11/2021 Zoldi

OTHER PUBLICATIONS

Wittenbach, J., d'Alessandro, B., & Bruss, C. B. (2020). Machine learning for temporal data in finance: Challenges and opportunities. arXiv preprint arXiv:2009.05636. (Year: 2020).*

Ladyzynski, P., Zbikowski, K., & Gawrysiak, P. (2019). Direct marketing campaigns in retail banking with the use of deep learning and random forests. Expert Systems with Applications, 134, 28-35. (Year: 2019).*

S. Russell and P. Norvig, Artificial Intelligence: A Modern Approach, 2nd Ed., 2003, chapt 18-21, pp. 649-789. (Year: 2003).*

* cited by examiner

EFFICIENT PROCESSING OF EXTREME INPUTS FOR REAL-TIME PREDICTION OF FUTURE EVENTS

FIELD

This invention relates generally to the field modeling subsequent events based on preceding events, and more particularly embodiments of the invention relate to reducing the size of input data provided to an artificial intelligence (AI) engine.

BACKGROUND

AI systems, algorithms, and the like can generally be used to predict a subsequent outcome based on previous events. For instance, data representing or associated with various events (e.g., events already taken place) may be fed into an AI system, and the AI system may be configured to determine a characteristic with respect to a subsequent outcome. AI systems are typically utilized to model data including a large number of parameters, values, and the like. In many situations, a larger amount of data relevant to the subsequent outcome may increase the accuracy of a generated output from the AI system. Further, AI systems may provide particular benefit when it is unknown which values within a large amount of data are relevant or most relevant to determining a characteristic of the subsequent outcome. Some AI algorithms include machine learning, in which the AI algorithm may alter internal parameters based on training data in order to increase fidelity with respect to a prediction of a characteristic of a subsequent outcome. Machine learning algorithms are typically more accurate when the data used to train the algorithm includes a large amount of data relevant to the subsequent outcome.

Generally, additional input data provided to an AI system is associated with increased processing time, an increase in algorithm training time, greater computing power consumption, and/or a reduction in available processing power for executing other computer-readable instructions. Improvement in the processing time, training time, and required processing power can typically be realized by reducing the input data or training data provided to the AI system and/or associated algorithm. However, a reduction in the quantity of input data provided to an AI system can reduce the accuracy of any characteristic determined with respect to the subsequent outcome.

In view of the circumstances described above, there is a need for a system to reduce the processing time and power necessitated by AI algorithms while maintaining a level of accuracy associated with expansive data input to the algorithm.

BRIEF SUMMARY

Embodiments of the present invention address the above needs and/or achieve other advantages by providing systems, apparatuses, and methods that reduces the size of an input data set by eliminating data points which are not relevant to increasing an accuracy of an output generated by an AI engine. Some embodiments of the present subject matter are suitable to reduce the size of a training input data set by eliminating data points which are not relevant to increasing an accuracy of an output generated by the AI engine. For example, systems, apparatuses, and methods disclosed herein may generate time windows and associate data of an input file with corresponding time windows. Instructions may be implemented to generate a user window value indicative of the interface used to generate the data within each time window, a characteristic indicative of previous event(s) that generated the data within each time window, or a combination of the preceding. Embodiments of the system are further configured to form an unnecessary portion of the raw input data having little or no value in modeling the occurrence of subsequent event based on previous events and or categorize such data points as unnecessary.

In some embodiments, the system may implement instruction to modify the input file to remove the unnecessary portion of the raw input data. Alternatively, the system may be configured to generate condensed input data, excluding the data points categorized as unnecessary. For instance, unnecessary data may have no or little correlation with accurately predicting of the subsequent outcome or may be intercorrelated with other input data having a higher correlation with accurate output data from the AI engine. Thus, various embodiments of the present subject matter may maintain a sufficient degree of accuracy in the result of an AI program while reducing the computation time, computational power, or the like necessitated by the AI engine or associated system. Further, implementations of methods and instructions described herein may allow input data including relatively few data points relevant to determining the output of the AI engine without unduly slowing process time or consuming undesirable amounts of processing power.

Aspects of the present subject matter are directed to a system for reducing a size of input data for use in an AI engine configured to predict a subsequent event. The system includes a computer with one or more processor and at least one of a memory device and a non-transitory storage device. The processor(s) executes computer-readable instructions to receive raw input data indicative of a plurality of previous events between an entity and a plurality of users associated with the entity. The raw input data includes a time associated with each previous event. Further, when the raw input data is processed by the artificial intelligence, the raw input data reduces an efficiency of producing an inference. The processor(s) also executes computer-readable instructions to determine, for each previous event, at least one of (1) an interface channel associated with a mode of interface with an associated user or (2) a characteristic indicative of the previous event. Further, the processor(s) executes computer-readable instructions to associate each datum generated via a previous event with at least one time window of a plurality of time windows. Additionally, processor(s) executes computer-readable instructions to generate a plurality of user window values. The user window values include a user window value for each user and each time window. Each user window value is indicative of at least one of (1) the interface channel associated with the mode of interface between the entity and the associated user for each datum within the associated time window or (2) the characteristic indicative of the previous event for each datum within the associated time window. Additionally, the processor(s) executes computer-readable instructions to form, based on each of the user window values, a first portion of the raw input data having an association value below a predetermined threshold with respect to preceding the subsequent event and a remaining portion of the raw input data. Also, the processor(s) executes computer-readable instructions to generate condensed input data including the remaining portion of the raw data such that the condensed input data includes fewer data points than in the raw input data. Further, when the condensed input data is processed by the artificial intelligence, the condensed input data improves the efficiency of producing the inference.

In at least one embodiment, the plurality of user window values may include a window value associated with each time window, respectively, indicative of (1) the interface channel associated with the mode of interface between the entity and the associated user for each datum within the associated time window and (2) the characteristic indicative of the previous event for each datum within the associated time window. Additionally or alternatively, the AI engine may include a machine learning algorithm, and the processor(s) may execute computer-readable instructions to communicate the condensed input data to the machine learning algorithm. In additional or alternative embodiments, the AI engine may include a neural network algorithm, and the processor(s) may execute computer-readable instructions to communicate the condensed input data to the neural network algorithm. In some additional or alternative embodiments, the AI engine may include a neural network, and the processor(s) may execute computer-readable instructions to communicate the condensed input data to a training module of the neural network algorithm.

In some embodiments, the interface channel for each previous event may be indicative of at least one of an online interaction with an enterprise system associated with the entity, a person-to-person interaction at a physical location associated with the entity, an automated interaction with a semi or fully autonomous system located at a physical location associated with the entity, a tele-interaction with an agent of the entity, or a semi or fully autonomous tele-interaction with the enterprise system associated with the entity. Additionally or alternatively, the characteristic indicative of the previous event, for each previous event respectively, may be indicative of whether the user at least one of withdrew assets held by the entity, deposited assets with the entity, transferred assets between at least one account associated with the entity and a second account different than the at least one account, interacted with an enterprise system to pay an outstanding amount due, requested account information associated with the respective user, received a recurring amount of assets from a third party, deposited a reoccurring user-initiated deposit, or caused an amount of assets held in an account associated with the entity to change. In additional or alternative embodiments, each time window of the plurality of time windows may include the same number of days sequentially arranged between the plurality of windows. In some embodiments, at least one time window of the plurality of time windows may include a first length of time, and at least one second time window of the plurality of time windows may include a second length of time. Moreover, the second length of time may be different than the first length of time.

In at least one embodiment, the subsequent event may include at least one of a user's need for a mortgage, a user's need for a money market account, a user's need for modification a current account associated with the entity, a user's need for a new account of a type associated with the entity, a user's need for personal financing, a user's need for a personal lease, or a user's need for a small business loan. In additional or alternative embodiments, a duration of time of at least one time window of the plurality of time windows may be at least partially determined by a type of subsequent event the AI engine is configured to predict. Additionally or alternatively, the duration of time of the at least one time window may be at least partially determined by the type of subsequent event including at least one of a user's need for a mortgage, a user's need for a money market account, a user's need for modification a current account associated with the entity, a user's need for a new account of a type associated with the entity, a user's need for personal financing, a user's need for a personal lease, or a user's need for a small business loan.

In another aspect, the present subject matter is directed to a system for reducing a size of input data for use in an artificial intelligence engine configured to predict a subsequent event. The system includes a computer having one or more processor and at least one of a memory device and a non-transitory storage device. The processor(s) execute computer-readable instructions to receive raw input data indicative of a plurality of previous events between an entity and a plurality of users associated with the entity. The raw input data further includes a time associated with each previous event. The processor(s) further execute computer-readable instructions to determine, for each previous event, at least one of (1) an interface channel associated with a mode of interface with an associated user or (2) a characteristic indicative of the previous event. The processor(s) also execute computer-readable instructions to associate each datum generated via a previous event with at least one time window of a plurality of time windows. The processor (s), by execution of the computer-readable instructions, generate a plurality of user window values including a user window value for each user and each time window. Each user window value is indicative of at least one of (1) the interface channel associated with the mode of interface between the entity and the associated user for each datum within the associated time window or (2) the characteristic indicative of the previous event for each datum within the associated time window. Additionally, execution of the computer-readable instructions by the processor(s) form, based on each of the user window values, a first portion of the raw input data having an association value below a predetermined threshold with respect to preceding the subsequent event and a remaining portion of the raw input data. In addition, the processor(s) execute computer-readable instructions to modify the raw input data by removing the first portion of the raw input data such that a modified input data includes fewer data points than in the raw input data.

In at least one embodiment, the plurality of user window values may include a window value associated with each time window, respectively, indicative of (1) the interface channel associated with the mode of interface between the entity and the associated user for each datum within the associated time window and (2) the characteristic indicative of the previous event for each datum within the associated time window. Additionally or alternatively, the artificial intelligence engine may include a machine learning algorithm. The processor(s) may executes computer-readable instructions to communicate the modified input data to the machine learning algorithm.

In another aspect, the present subject matter is directed to a method for reducing a size of input data for use in an artificial intelligence engine configured to predict a subsequent event. The method includes receiving, at a computer device, raw input data indicative of a plurality of previous events between an entity and a plurality of users associated with the entity. The raw input data includes a time associated with each previous event. The method further includes determining, for each previous event, at least one of (1) an interface channel associated with a mode of interface with an associated user or (2) a characteristic indicative of the previous event. The method further includes associating each datum generated via a previous event with at least one time window of a plurality of time windows. In another element, the method includes generating, utilizing the computing device, a plurality of user window values including a user window value for each user and each time window. Each user window value is indicative of at least one of (1) the interface channel associated with the mode of interface between the entity and the associated user for each datum within the associated time window or (2) the characteristic indicative of the previous event for each datum within the associated time window. Further, the method includes associating, based on each of the user window values, a first portion of the raw input data having an association value below a predetermined threshold with respect to preceding the subsequent event and a remaining portion of the raw input data. The method additionally includes generating, utilizing the computing device, condensed input data including the remaining portion of the raw data such that the condensed input data includes fewer data points than in the raw input data.

In at least one embodiment, the plurality of user window values may include a window value associated with each time window, respectively, indicative of (1) the interface channel associated with the mode of interface between the entity and the associated user for each datum within the associated time window and (2) the characteristic indicative of the previous event for each datum within the associated time window. In an additional or alternative embodiment, the interface channel for each previous event may be indicative of at least one of an online interaction with an enterprise system associated with the entity, a person-to-person interaction at a physical location associated with the entity, an automated interaction with a semi or fully autonomous system located at a physical location associated with the entity, a tele-interaction with an agent of the entity, or a semi or fully autonomous tele-interaction with the enterprise system associated with the entity.

In some additional or alternative embodiments, the characteristic indicative of the previous event, for each previous event respectively, may be indicative of whether the user at least one of withdrew assets held by the entity, deposited assets with the entity, transferred assets between at least one account associated with the entity and a second account different than the at least one account, interacted with an enterprise system to pay an outstanding amount due, requested account information associated with the respective user, received a recurring amount of assets from a third party, deposited a reoccurring user-initiated deposit, or caused an amount of assets held in an account associated with the entity to change. Additionally or alternatively, the subsequent event may include at least one of a user's need for a mortgage, a user's need for a money market account, a user's need for modification a current account associated with the entity, a user's need for a new account of a type associated with the entity, a user's need for personal financing, a user's need for a personal lease, or a user's need for a small business loan.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
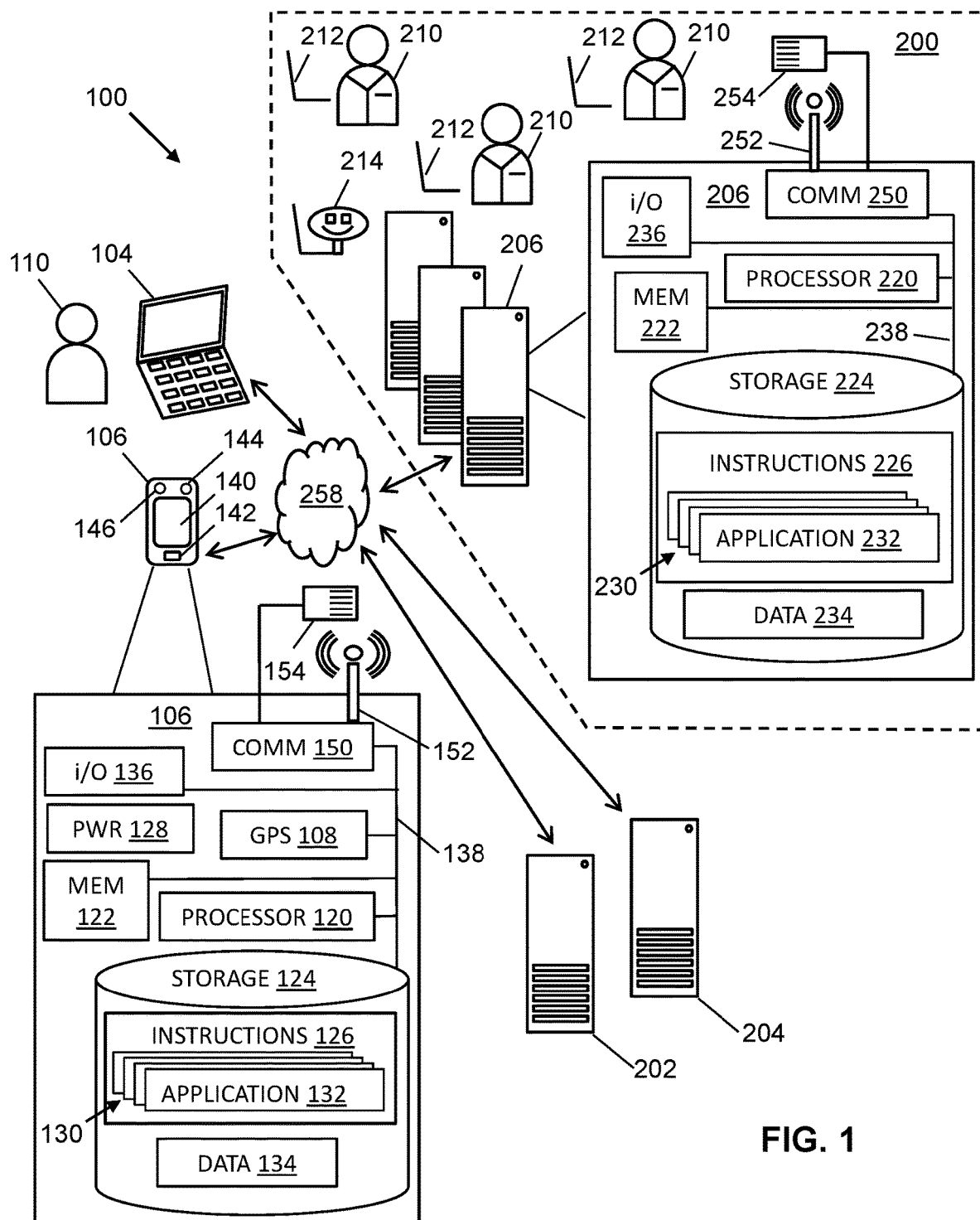

Having thus described embodiments of the invention in general terms, reference will now be made to the accompanying drawings, wherein:

FIG. 1 illustrates an enterprise system, and environment thereof, according to at least one embodiment.

Figure 2A:
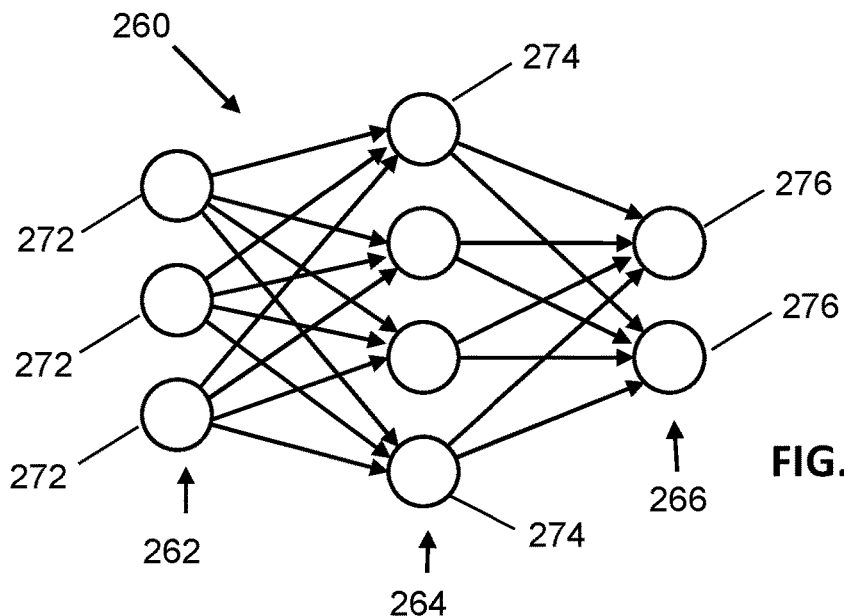

FIG. 2A is a diagram of a feedforward network, according to at least one embodiment, utilized in machine learning.

Figure 2B:
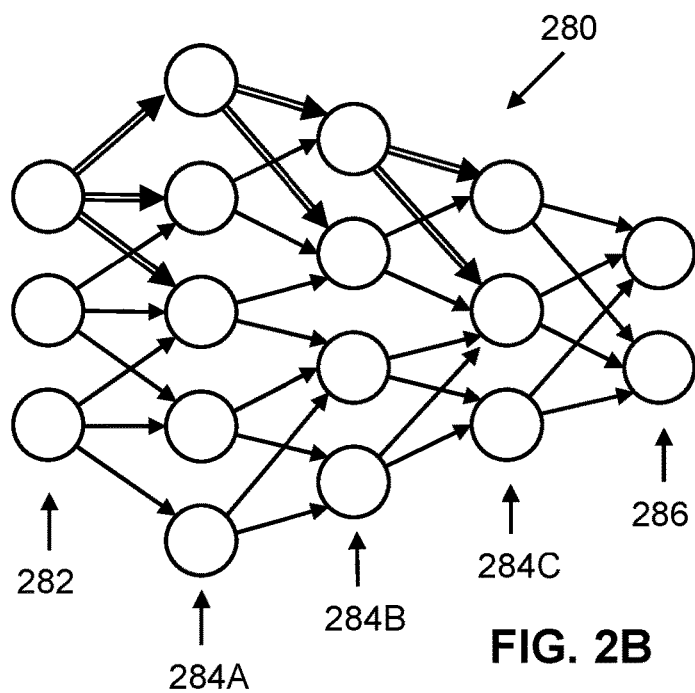

FIG. 2B is a diagram of a convolution neural network, according to at least one embodiment, utilized in machine learning.

Figure 2C:
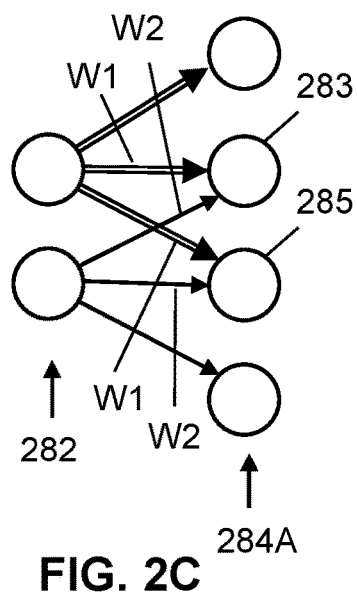

FIG. 2C is a diagram of a portion of the convolution neural network of FIG. 2B, according to at least one embodiment, illustrating assigned weights at connections or neurons.

Figure 3:
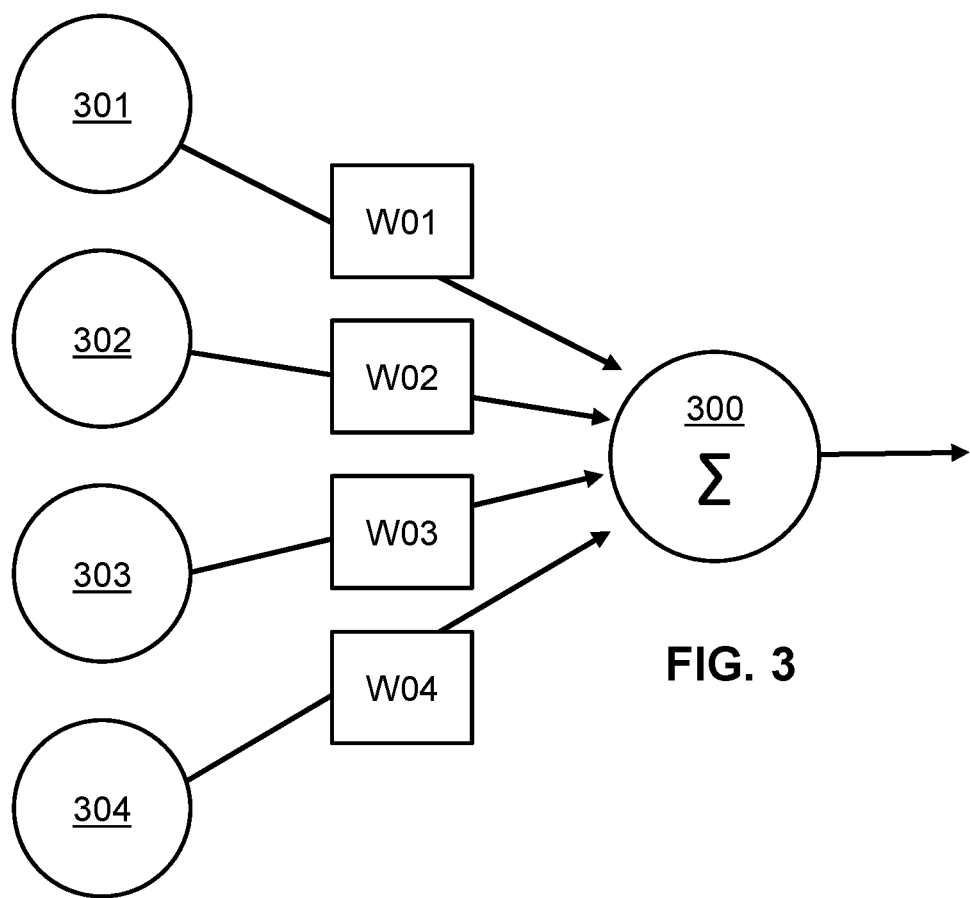

FIG. 3 is a diagram representing an exemplary weighted sum computation in a node in an artificial neural network.

Figure 4:
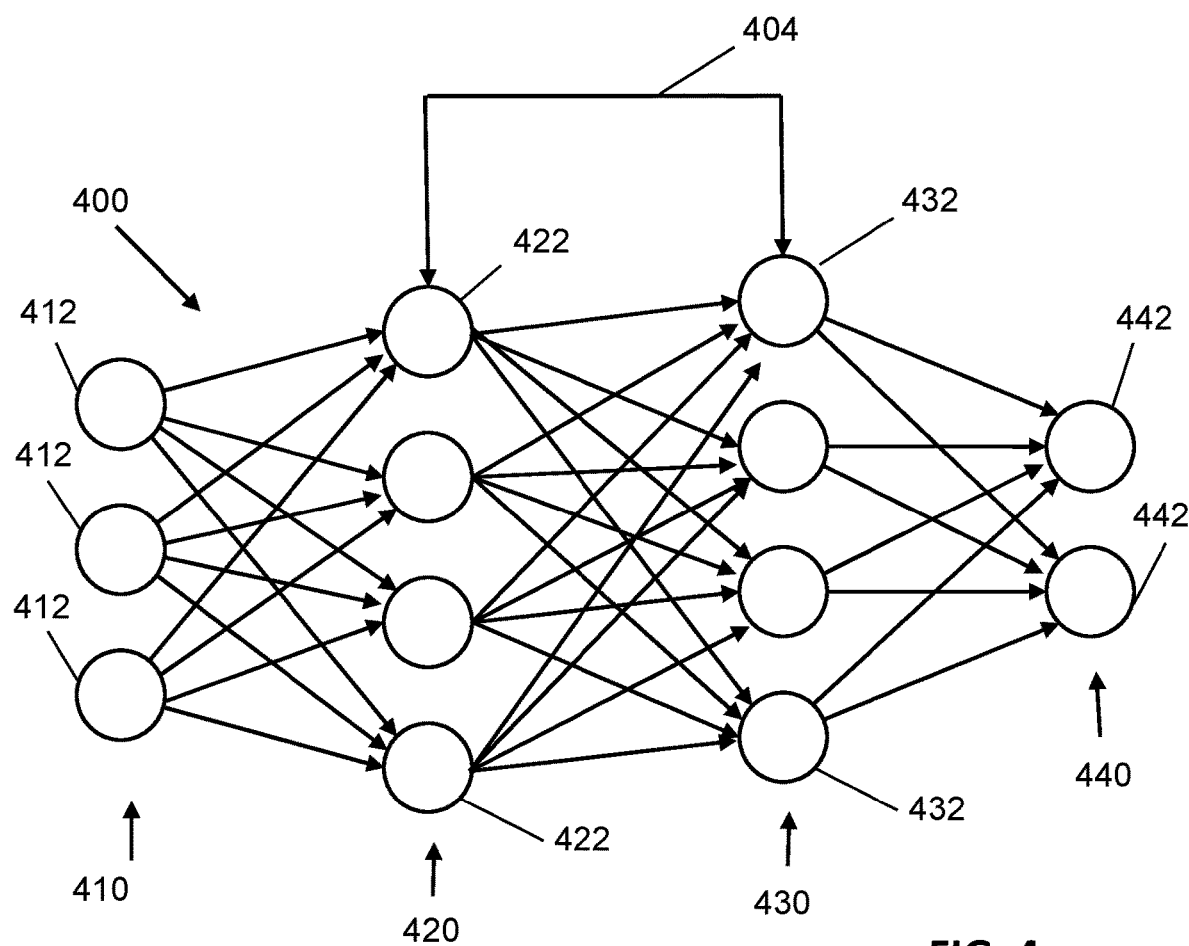

FIG. 4 is a diagram of a Recurrent Neural Network RNN, according to at least one embodiment, utilized in machine learning.

Figure 5:
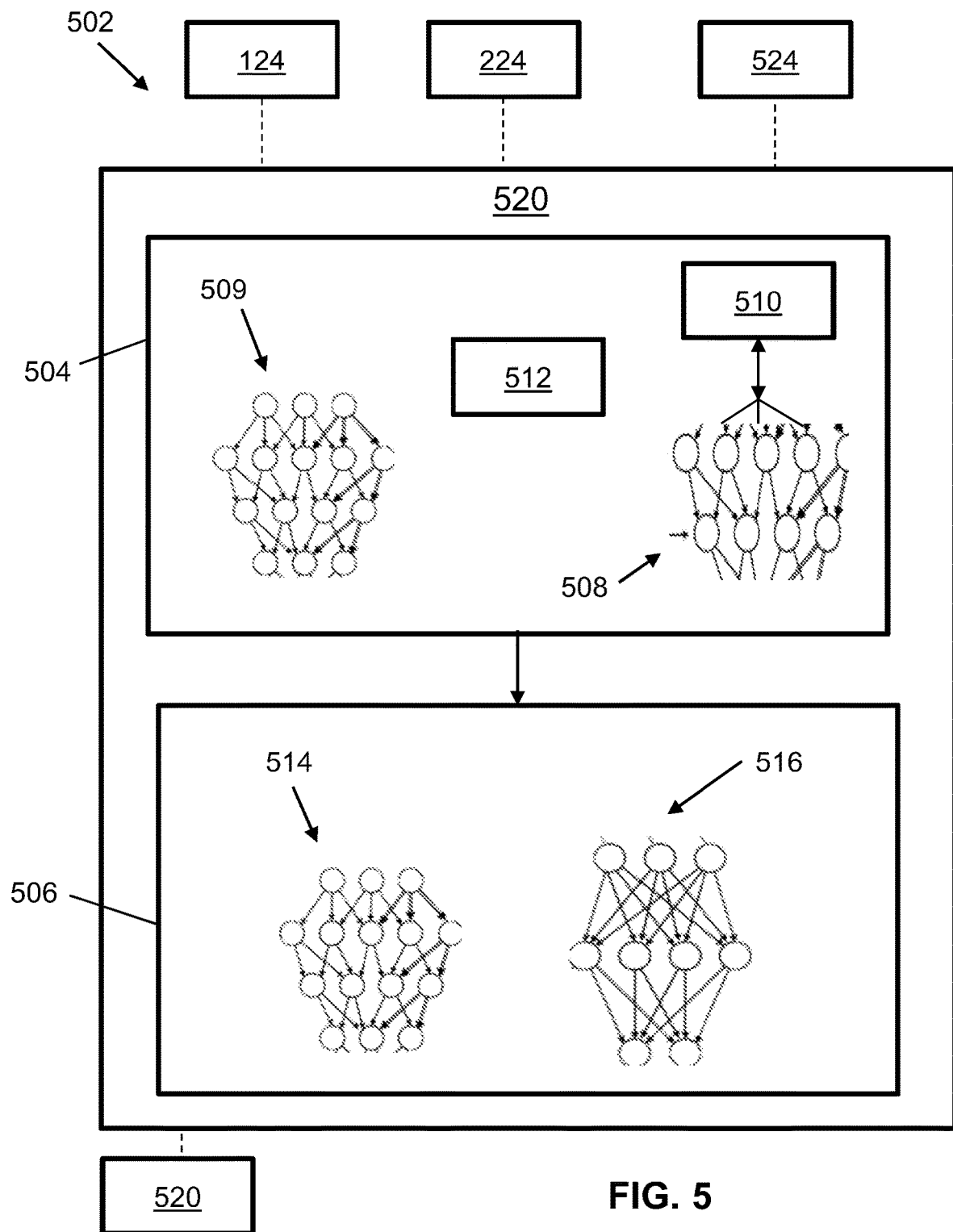

FIG. 5 is a schematic logic diagram of an artificial intelligence program including a front-end and a back-end algorithm.

Figure 6:
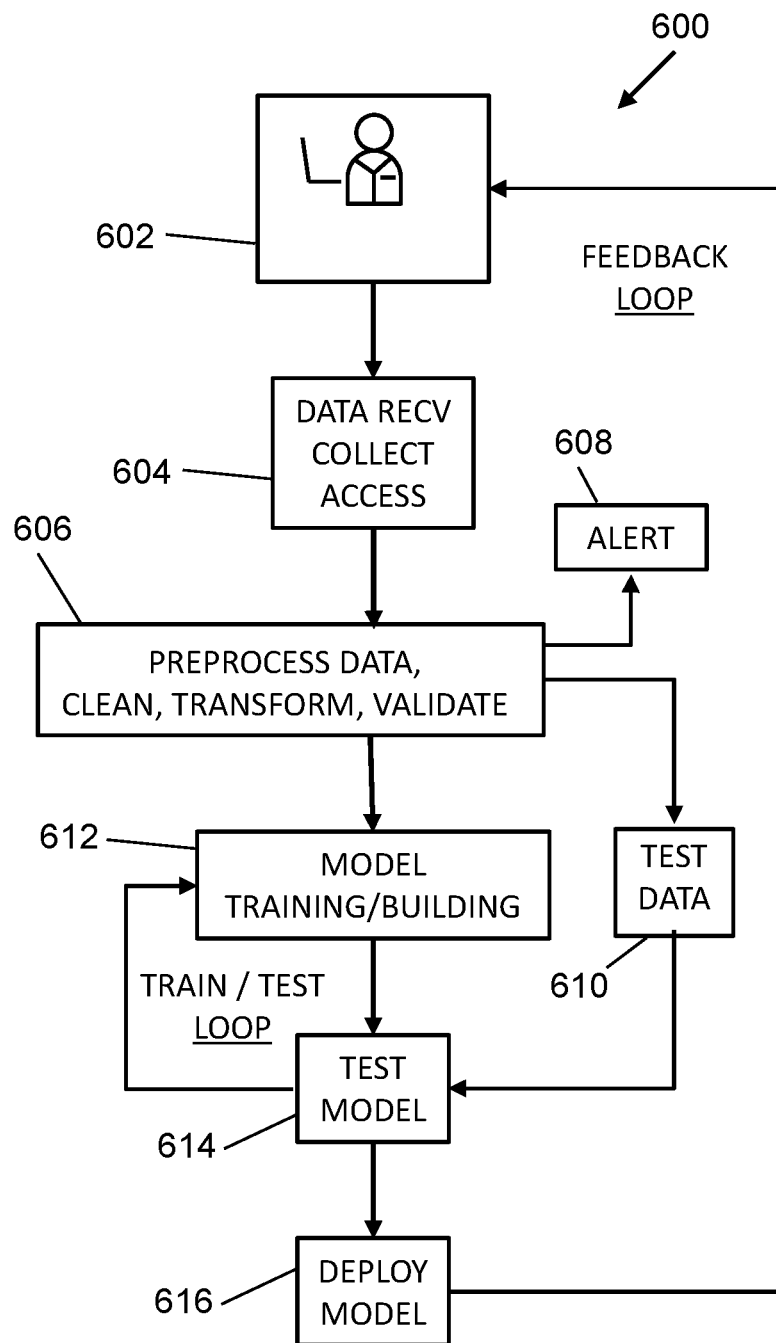

FIG. 6 is a flow chart representing a method, according to at least one embodiment, of model development and deployment by machine learning.

Figure 7:
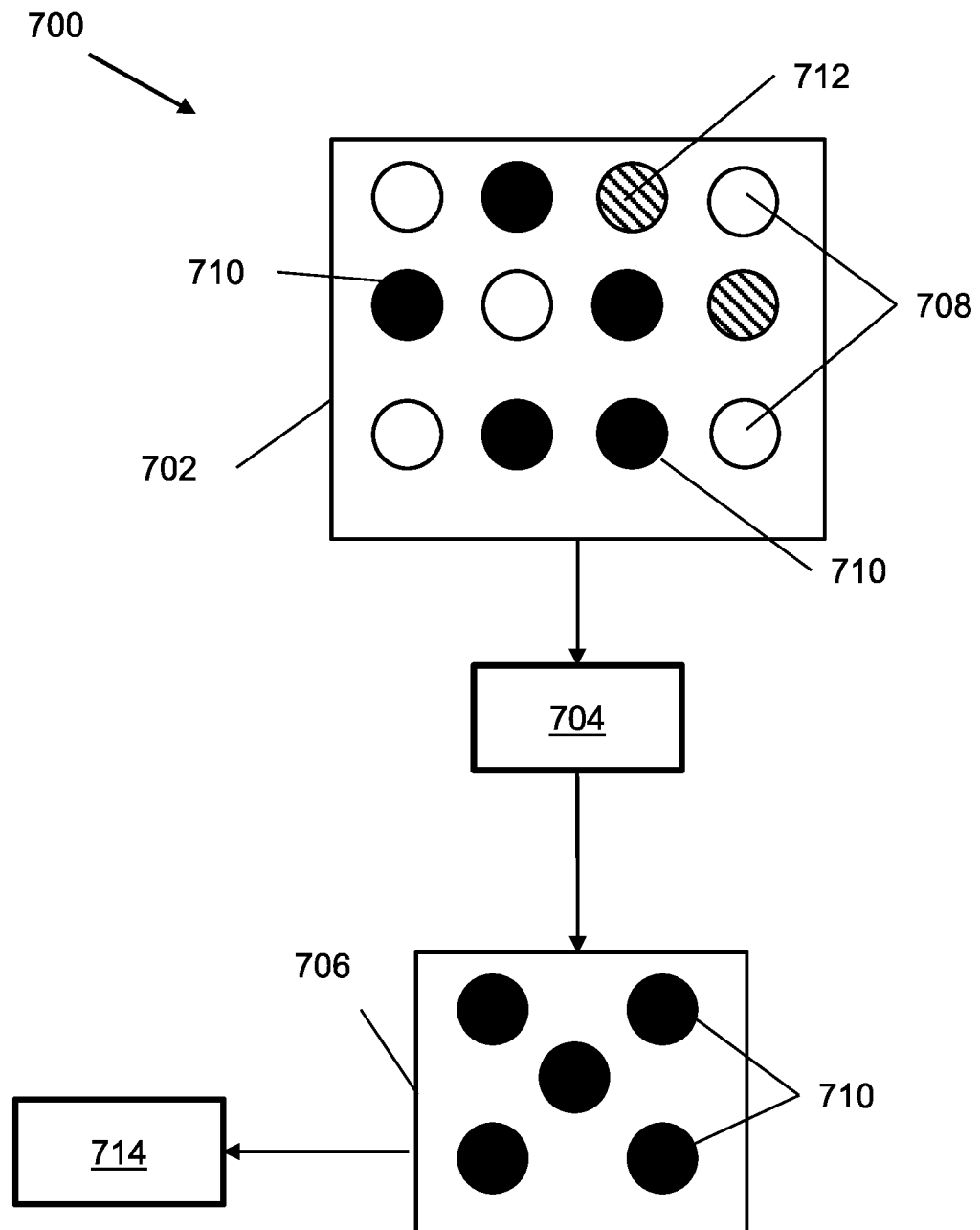

FIG. 7 illustrates one embodiment of a system for reducing a size of input data provided to an AI engine, in accordance with aspects of the present subject matter.

Figure 8:
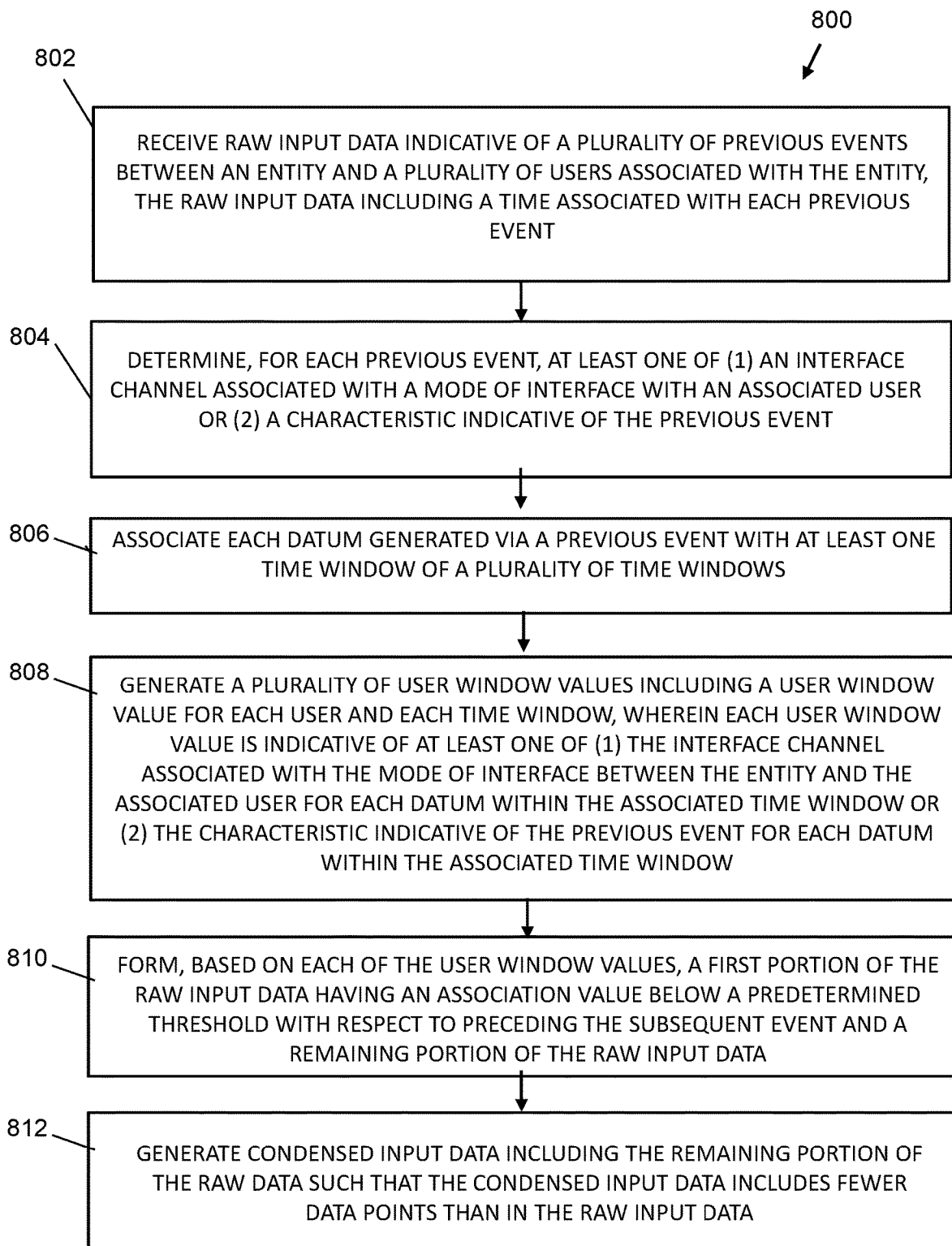

FIG. 8 illustrates one embodiment of a method for reducing a size of input data provided to an AI engine, in accordance with aspects of the present subject matter.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence engine (e.g., an artificial intelligence system, artificial intelligence algorithm, artificial intelligence module, program, and the like) generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence engine may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

With reference to the general architecture, features, and function of AI engines as described above, such as neural networks and other machine learning algorithms, the present subject matter is also directed to applications in which an input file contains data unrelated to improving an accuracy of an inference generated utilizing the AI engine (e.g., data communicated from the AI engine or output data). Unrelated data, redundant for purposes of improving the accuracy of the output data, or the like may be removed from the input data prior to communicating the data (e.g., condensed input data) to the AI system for use in modeling output data or training a suitably configured AI engine. As used herein, the terms "user" and "entity" describe at least two parties in the context of certain example past events, such as commercial interactions between the entity and one user or multiple users, and the generation of predictions with reference to a characteristic of a subsequent event, such as probabilities that a subsequent event or type event may occur. However, it is to be understood that the example of a user and a entity are merely illustrative, and that the techniques of the present disclosure are applicable to all manner of input data processing utilizing AI techniques, as used herein.

In an exemplary embodiment and as illustrated schematically with reference to FIG. 7, a system 700 is generally suitable to reduce a size of an input data set (e.g., input data 702) for use in an AI system. For example, an associated AI engine 714 or the like may be configured to generate an inference, e.g., a prediction associated with a subsequent event based on data associated with and/or representative of previous events. Thus, and as shown, input data 702 may be communicated to a reduction algorithm 704 configured to reduce a size of data (e.g., condensed input data 706) for faster, less resource intense, etc. processing. As illustrated, a size of the schematic box associated with 702 is larger than a size of the box associated with the condensed input data 706. As explained in more detail below, embodiments of methods associated with the system 700 and/or reduction algorithm 704 disclosed herein may include computer readable instructions suitable to reduce the size of input data 702 for processing by an AI program 714 without reducing an accuracy of provided AI output data, at least to an appreciable or unacceptable degree. For instance, input data 702 for AI processing often includes data that is irrelevant or has negligible value for determining an accurate or acceptable output from the AI program, training an AI program, or the like.

Thus, FIG. 7 illustrates condensed input data 706 that does not include data points irrelevant or having negligible value in generating an accurate AI output or inference (e.g., irrelevant data represented by white circles 708). However, data points having a high value for generating an accurate or desirable output from the AI program (represented by black circles 710) are retained within condensed input data 706. In some situations, the input data 706 may include data points having a substantial value in generating an accurate AI output while still providing less value than the data points having a high value 710 (e.g., striped circles 712). Thus, additionally or alternatively, the system 700 may be configured to generate condensed output data 706 which includes only high value data points 710 with respect to generating an accurate or desired AI output from the AI engine 714.

In exemplary aspects, the system 700 may be associated, communicatively coupled to, or included with an AI engine 714 programed to output the probability that a user(s) will be associated with a subsequent event or a type of subsequent event. In some embodiments, the AI engine 714 may be programed to implement instructions to output (e.g., generate an inference) whether one or more users are likely to need a mortgage, a money market account, modification of a current account associated with the entity, a need for a new account of a type associated with the entity, a need for personal financing, a personal lease, or a small business loan. Thus, embodiments of system 700 may reduce processing requirements for the AI engine 714 to generate or produce an accurate inference, such as an output including an assessment that one or more users will be associated with a particular subsequent event of interest (e.g., a user defaulting on an obligation or requiring additional services associated with the entity). Additionally or alternatively, the AI engine 714 may include a machine learning algorithm or the like capable of being trained utilizing training data (e.g., previous input data associated with known outputs, acceptable outputs, and the like). In some embodiments, the AI engine 714 may include at least one of a deep neural network, a CNN, a front-end algorithm, a back-end algorithm, statistical models or machine learning programs such as decision tree learning, associate rule learning, recurrent artificial neural networks, support vector machines, and the like.

In some embodiments, at least a portion of AI engine 714 and/or reduction algorithm 704 may be implemented on the AI processor 520, the processing device 120, the processing device 220, and/or one or more dedicated processing device or processing devices associated with the system 700. In various embodiments, instructions associated with the AI engine 714 and/or reduction algorithm 704 may be stored in an associated memory device and/or storage device of the system (e.g., memory device 124 and/or memory device 224) communicatively coupled to the associated processor(s). Additionally or alternatively, the system 700 may include one or more memory devices and/or storage devices for processing use and/or including one or more instructions necessary for operation of the AI engine 714 and/or reduction algorithm 704.

Referring now to FIG. 8, an exemplary embodiment of a method 800 is illustrated for reducing a size of input data for use in an AI engine configured to predict a subsequent event. As shown in element 802, the method 800 may include receiving raw input data (e.g. input data 702) indicative of a plurality of previous events between an entity and a plurality of users associated with the entity. Furthermore, the raw input data may include a time element associated with each data point corresponding to a previous event between the entity and a user. For example, the time element may be a date and time of the respective previous event, a timestamp, or the like. At element 804, the method 800 may include determining, for each previous event (e.g., each previous event represented by the raw input data), at least one of (1) an interface channel associated with a mode of interface with an associated user or (2) a characteristic indicative of the previous event.

In some embodiments, an interface channel for each previous event, as used herein, may be indicative the location the interface or the type of interface utilized in the associated previous event. For instance, each interference channel may indicate at least one of an online interaction with an enterprise system (e.g., enterprise system 200) associated with the entity, a person-to-person interaction at a physical location associated with the entity, an automated interaction with a semi or fully autonomous system (e.g., virtual agent 214, an automated teller device, or the like) located at a physical or virtual location associated with the entity, a tele-interaction with an agent 210 of the entity, or a semi or fully autonomous tele-interaction with the enterprise system 200 associated with the entity.

In at least one embodiment, a characteristic indicative of an associated previous event, as used herein, may be indicative of whether one or more users withdrew assets held by the entity, deposited assets with the entity, transferred assets between at least one account associated with the entity and a second account different than the at least one account, interacted with an enterprise system to pay an outstanding amount due, requested account information associated with the respective user, received a recurring amount of assets from a third party, deposited a reoccurring user-initiated deposit, or caused an amount of assets held in an account associated with the entity to change.

In a further or alternative embodiment, the method 800 may include associating each data point generated via a previous event with one or more time windows associated with the previous event, as shown in element 806. Thus, each data point associated and/or generated in a previous event between the entity and a user may be associated with the appropriate time window(s). In some embodiments, each time window may include the same number of days sequentially and/or equally arranged between the time windows. In one embodiment, each time period may be approximately 1-2 days in length. In another embodiment, each time period may be approximately 1-7 days in length. In some embodiments, one or more time windows may include, represent, etc. a first length of time, and one or more secondary time windows may include a second length of time. Moreover, the second length of time may be different than the first length of time.

The method 800 may include, as shown in element 808, generating a plurality of user window values. Generally a user window value is provided for each combination of user and time window represented by the raw input data. Each user window value is indicative of at least one of (1) the interface channel associated with the mode of interface between the entity and the associated user for each datum within the associated time window or (2) the characteristic indicative of the previous event for each datum within the associated time window. In several embodiments, each user window value may be indicative of or determined from both the associated (1) interface channel and the associated (2) characteristic indicative of the respective previous event.

In some embodiments, a duration of time associated with one or more of the time windows may be determined, at least in part, by the type of subsequent event the AI algorithm (e.g., AI engine 714) is configured to determine, predict, or assess the probability thereof. For instance, a duration of time associated with or corresponding with a time window (s) may be at least partially determined by the type of subsequent event in which the AI algorithm is trained or configured to predict, such as a user's need for a mortgage, a user's need for a money market account, a user's need for modification a current account associated with the entity, a user's need for a new account of a type associated with the entity, a user's need for personal financing, a user's need for a personal lease, or a user's need for a small business loan.

As depicted with respect to element 810, the method 800 may include forming, based on each of the user window values, a first portion of the raw input data having an association value below a predetermined threshold with respect to preceding the subsequent event and a remaining portion of the raw input data. For instance, each data point of the raw input data formed or sorted within the first portion may include data irrelevant for generating an accurate AI inference/output or redundant to data points having a high value for determining an accurate or desired AI output for an associated AI algorithm, e.g., AI engine 714. As shown in element 812, the method 800 may include generating condensed input data including the remaining portion of the raw data such that the condensed input data includes fewer data points than in the raw input data.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for reducing a size of input data to predict a subsequent event, the system comprising:
   (a) a computer comprising a processor;
   (b) a non-transitory storage device that stores executable code that, when executed, causes the processor to:
   implement an artificial intelligence software engine comprising (1) a front-end program comprising a first machine learning software module and (2) a back-end program communicatively coupled to the front end program, wherein the back-end program comprises a second machine learning software module;
   receive raw input data indicative of a plurality of previous events between an entity and a plurality of users associated with the entity, the raw input data including a time associated with each previous event;
   determine, for each previous event, at least one of (1) an interface channel associated with a mode of interface with an associated user or (2) a characteristic indicative of the previous event;
   assign each datum generated via a previous event to at least one time window of a plurality of time windows;
   generate a plurality of user window values including a user window value for each user and each time window, wherein each user window value is indicative of at least one of (1) the interface channel associated with the mode of interface between the entity and the associated user for each datum within the associated time window or (2) the characteristic indicative of the previous event for each datum within the associated time window;
   activate the front-end program first machine learning software module to create a front end trained neural network by performing operations that include
      (i) iteratively training using the raw input data, a front end neural network to generate association values for the raw input data, wherein the association values relate to effectiveness of the raw input data in predicting a subsequent event,
      (ii) inserting the raw input data into a first iterative training and testing loop to predict a first target variable representing one of the association values, and
      (iii) repeatedly determining, during each iteration of the first training and testing loop, the first target variable, wherein each iteration of the first training and testing loop has differing weights assigned to one or more nodes of the front end neural network, each of the differing weights being updated with each iteration of the first training and testing loop to reduce error in predicting the first target variable and improve predictability of the front end neural network thereby creating the trained front end neural network;
   deploy the front end trained neural network on the system;
   activate the front end trained neural network to (1) determine the association value for each datum by processing the raw input data, and (2) form, based on each of the user window values, a first portion of the raw input data having an association value below a predetermined threshold with respect to preceding the subsequent event and a remaining portion of the raw input data having the association value above the predetermined threshold; and
   generate condensed input data comprising the remaining portion without the first portion of the raw input data, wherein the condensed input data, when processed by the artificial intelligence engine, reduces the processing time and power required to process the raw input data, activate the back-end program second machine learning software module to
iteratively train using the condensed input data, a back end neural network to generate predictions for subsequent events,
insert the condensed input data into a second iterative training and testing loop to predict a second target variable representing a subsequent event,
repeatedly determine, during each iteration of the second training and testing loop, the second target variable, wherein each iteration of the second training and testing loop has differing weights assigned to one or more nodes of the back end neural network, each of the differing weights being updated with each iteration of the second training and testing loop to reduce error in predicting the second target variable and improve predictability of the back end neural network thereby creating a trained back end neural network, and
deploy the trained back end neural network on the system, wherein
the trained back end neural network is communicatively coupled to the front end trained neural network,
the back end trained neural network accepts the raw input data from the system and utilizes the raw input data to predict subsequent events comprising at least one of a user's need for a money market account, a user's need for modification a current account associated with the entity, or a user's need for a new account of a type associated with the entity.

2. The system of claim 1, wherein the plurality of user window values includes a window value associated with each time window, respectively, indicative of (1) the interface channel associated with the mode of interface between the entity and the associated user for each datum within the associated time window and (2) the characteristic indicative of the previous event for each datum within the associated time window.

3. The system of claim 1, wherein the interface channel for each previous event is indicative of at least one of an online interaction with an enterprise system associated with the entity, a person-to-person interaction at a physical location associated with the entity, an automated interaction with a semi or fully autonomous system located at a physical location associated with the entity, a tele-interaction with an agent of the entity, or a semi or fully autonomous tele-interaction with the enterprise system associated with the entity.

4. The system of claim 1, wherein the characteristic indicative of the previous event, for each previous event respectively, is indicative of whether the user at least one of withdrew assets held by the entity, deposited assets with the entity, transferred assets between at least one account associated with the entity and a second account different than the at least one account, interacted with an enterprise system to pay an outstanding amount due, requested account information associated with the respective user, received a recurring amount of assets from a third party, deposited a reoccurring user-initiated deposit, or caused an amount of assets held in an account associated with the entity to change.

5. The system of claim 1, wherein each time window of the plurality of time windows includes the same number of days sequentially arranged between the plurality of windows.

6. The system of claim 1, wherein at least one time window of the plurality of time windows comprises a first length of time, and at least one second time window of the plurality of time windows comprises a second length of time, the second length of time different than the first length of time.

7. The system of claim 1, wherein a duration of time of at least one time window of the plurality of time windows is at least partially determined by a type of subsequent event the artificial intelligence engine is configured to predict.

8. The system of claim 7, wherein the duration of time of the at least one time window is at least partially determined by the type of subsequent event including at least one of a user's need for a money market account, a user's need for modification of a current account associated with the entity, a user's need for a new account of a type associated with the entity, or a user's need for a personal lease.

9. A system for reducing a size of input data for use in an artificial intelligence engine comprising:
(a) an entity web-server that receives raw input data from a plurality of remote user computing devices, wherein at least part of the raw input data is entered during previous remote events by a plurality of remote users associated with the entity;
(b) an enterprise terminal that receives raw input data entered during previous in-person events by a plurality of users associated with the entity;
(c) an entity computer comprising a processor and a non-transitory storage device that stores executable software code that, when executed, causes the processor to:
receive the raw input data indicative of the remote and in-person previous events between the entity and the plurality of remote users and the plurality of users associated with the entity, the raw input data including a time associated with each remote previous event and each in-person previous event;
determine, for each remote previous event and each in-person previous event, at least one of (1) an interface channel indicating whether the raw data was generated during a remote previous event or in-person previous event or (2) a characteristic indicative of the remote or in-person previous event;
associate each datum generated via the remote previous event or in-person previous event with at least one time window of a plurality of time windows; and
generate a plurality of user window values including a user window value for each user and each time window, wherein each user window value is indicative of at least one of (1) the interface channel associated with the mode of interface between the entity and the associated user for each datum within the associated time window or (2) the characteristic indicative of the previous event for each datum within the associated time window;
(d) a front-end program comprising a first machine learning software module, wherein the front end program performs operations comprising
processing the raw input data to determine an association value for each datum;
forming, based on each of the user window values, a first portion of the raw input data having an association value below a predetermined threshold with respect to preceding the subsequent event and a remaining portion of the raw input data; and
modifying the raw input data by removing the first portion of the raw input data such that a modified input data includes fewer data points than in the raw input data, wherein the modified data requires less time and less power to train a neural network than using the raw input data; and (e) a machine learning software module that causes the processor to iteratively train, using the modified input data, the neural network to generate predictions for subsequent events and a characteristic indicative of each subsequent event, insert the condensed input data into an iterative training and testing loop to predict a target variable, repeatedly determine, during each iteration of the training and testing loop, the target variable, wherein each iteration of the training and testing loop has differing weights assigned to one or more nodes of the neural network, each of the differing weights being updated with each iteration of the training and testing loop to reduce error in predicting the target variable and improve predictability of the neural network thereby creating a trained neural network, and deploy the trained neural network on an enterprise system, wherein the trained neural network is communicatively coupled to the artificial intelligence engine, the trained neural network accepts the raw input data from the enterprise system and utilizes the raw input data to predict subsequent events and a characteristic indicative of each subsequent event, the subsequent events comprise at least one of a user's need for a mortgage, a user's need for a money market account, a user's need for modification a current account associated with the entity, a user's need for a new account of a type associated with the entity, a user's need for personal financing, a user's need for a personal lease, or a user's need for a small business loan, the characteristic indicative of each subsequent event comprises at least one of whether the user at least one of withdrew assets held by the entity, deposited assets with the entity, transferred assets between at least one account associated with the entity and a second account different than the at least one account, interacted with an enterprise system to pay an outstanding amount due, requested account information associated with the respective user, received a recurring amount of assets from a third party, deposited a reoccurring user-initiated deposit, or caused an amount of assets held in an account associated with the entity to change.

10. The system of claim 9, wherein the plurality of user window values includes a window value associated with each time window, respectively, indicative of (1) the interface channel associated with the mode of interface between the entity and the associated user for each datum within the associated time window and (2) the characteristic indicative of the previous event for each datum within the associated time window.

11. The system of claim 9, wherein the artificial intelligence engine includes a machine learning algorithm, and the one or more processor executes computer-readable instructions to:

communicate the modified input data to the machine learning algorithm.

12. A method for reducing a size of input data for use in an artificial intelligence engine configured to predict a subsequent event, the method comprising:

receiving, at a computer device, raw input data indicative of a plurality of previous events between an entity and a plurality of users associated with the entity, the raw input data including a time associated with each previous event;

determining, for each previous event, at least one of (1) an interface channel associated with a mode of interface with an associated user or (2) a characteristic indicative of the previous event;

associating each datum generated via a previous event with at least one time window of a plurality of time windows;

generating, utilizing the computing device, a plurality of user window values including a user window value for each user and each time window, wherein each user window value is indicative of at least one of (1) the interface channel associated with the mode of interface between the entity and the associated user for each datum within the associated time window or (2) the characteristic indicative of the previous event for each datum within the associated time window;

iteratively training, using the raw input data, a front end neural network to generate prediction values that relate to effectiveness of the raw input data in predicting a subsequent event, by executing operations comprising (i) inserting the raw input data into an first iterative training and testing loop to predict a first target variable; (ii) repeatedly determining, during each iteration of the first training and testing loop, the first target variable, wherein each iteration of the first training and testing loop has differing weights assigned to one or more nodes of the front end neural network, each of the differing weights being updated with each iteration of the first training and testing loop to reduce error in predicting the first target variable and improve accuracy of the front end neural network in generating predictive values thereby creating a trained front end neural network:

generating, by the front end neural network, a predictive value for each datum within the raw training data, and generating condensed input data comprising a first portion of the raw input data having the predictive value below a predetermined threshold with respect to predicting a subsequent event, and a remaining portion of the raw input data such that the first portion of the raw input data and the remaining portion of the raw input data includes fewer data points than in the raw input data;

iteratively training, using training data, a back end neural network to generate predictions of subsequent events by operations comprising (i) inserting the training data into a second iterative training and testing loop to predict a second target variable;

(ii) repeatedly determining, during each iteration of the second training and testing loop, the second target variable, wherein each iteration of the second training and testing loop has differing weights assigned to one or more nodes of the back end neural network, each of the differing weights being updated with each iteration of the second training and testing loop to reduce error in predicting the second target variable and improve predictability of the back end neural network thereby creating a trained back end neural network;

deploying the trained back end neural network on the system as an integrated component of the artificial intelligence engine;

feeding condensed input data to the artificial intelligence engine, wherein the artificial intelligence engine generates predictions for the subsequent events based on the condensed input data, and the artificial intelligence engine consumes less power when making predictions with the condensed input data than making predictions with the raw input data.

13. The method of claim 12, wherein the plurality of user window values includes a window value associated with each time window, respectively, indicative of (1) the interface channel associated with the mode of interface between the entity and the associated user for each datum within the associated time window and (2) the characteristic indicative of the previous event for each datum within the associated time window.

14. The method of claim 12, wherein the interface channel for each previous event is indicative of at least one of an online interaction with an enterprise system associated with the entity, a person-to-person interaction at a physical location associated with the entity, an automated interaction with a semi or fully autonomous system located at a physical location associated with the entity, a tele-interaction with an agent of the entity, or a semi or fully autonomous tele-interaction with the enterprise system associated with the entity.

15. The method of claim 12, wherein the characteristic indicative of the previous event, for each previous event respectively, is indicative of whether the user at least one of withdrew assets held by the entity, deposited assets with the entity, transferred assets between at least one account associated with the entity and a second account different than the at least one account, interacted with an enterprise system to pay an outstanding amount due, requested account information associated with the respective user, received a recurring amount of assets from a third party, deposited a reoccurring user-initiated deposit, or caused an amount of assets held in an account associated with the entity to change.

16. The method of claim 12, wherein the subsequent event comprises at least one of a user's need for a mortgage, a user's need for a money market account, a user's need for modification a current account associated with the entity, a user's need for a new account of a type associated with the entity, a user's need for personal financing, a user's need for a personal lease, or a user's need for a small business loan.

* * * * *